United States Patent [19]

Wiese

[11] 4,109,920
[45] Aug. 29, 1978

[54] HEAT EXCHANGER FOR SHAFT SEAL CARTRIDGE

[75] Inventor: Winfred John Wiese, Whittier, Calif.

[73] Assignee: Borg-Warner Corporation, Chicago, Ill.

[21] Appl. No.: 830,519

[22] Filed: Sep. 6, 1977

[51] Int. Cl.² ............................................. F16J 15/40
[52] U.S. Cl. ...................................... 277/17; 277/22; 277/65; 415/112; 415/180
[58] Field of Search .................... 277/3, 15–18, 277/21, 22, 38–41, 61, 62, 65, 84, 166; 415/111, 112, 175–180; 417/372

[56] References Cited

U.S. PATENT DOCUMENTS

| 2,628,852 | 2/1953 | Voytech | 277/61 X |
| 3,334,905 | 8/1967 | Horwitz et al. | 277/61 X |
| 3,360,272 | 12/1967 | Blom et al. | 277/65 X |
| 3,459,430 | 8/1969 | Ball | 277/3 |
| 3,489,419 | 1/1970 | Stratienko | 277/22 X |
| 3,539,270 | 11/1970 | Derrickson | 277/15 X |
| 3,600,101 | 8/1971 | Oglesby | 277/16 X |
| 3,630,529 | 12/1971 | Ball | 277/22 |
| 3,877,706 | 4/1975 | Haas et al. | 277/41 |
| 3,884,482 | 5/1975 | Ball et al. | 277/17 |
| 4,005,747 | 2/1977 | Ball | 277/3 X |

FOREIGN PATENT DOCUMENTS 375,400 6/1932 United Kingdom ................ 277/15

Primary Examiner—Robert S. Ward, Jr.
Attorney, Agent, or Firm—Aubrey L. Burgess

[57] ABSTRACT

An improved heat exchanger especially for use with a mechanical seal cartridge applicable for a pump-motor combination. The heat exchanger comprises an axial flow pump for supplying cooling fluid to the seal and axial shrouded fins and passages respectively surrounding a housing for the seals and inwardly in the housing, there being a path for the cooling fluid between the shrouded fins and the passages. Means are provided to direct cooling air through the passages and along the fins.

7 Claims, 2 Drawing Figures

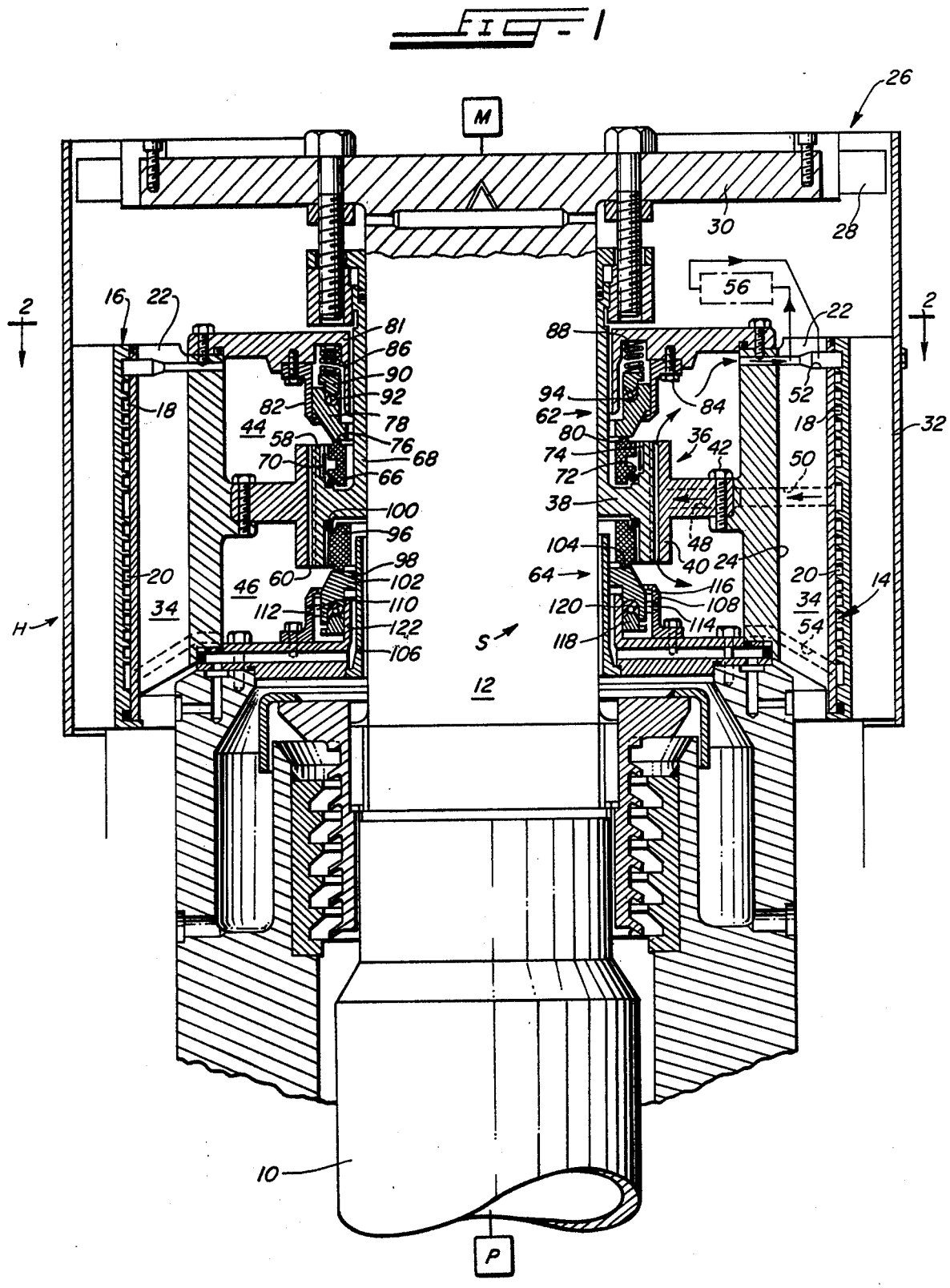

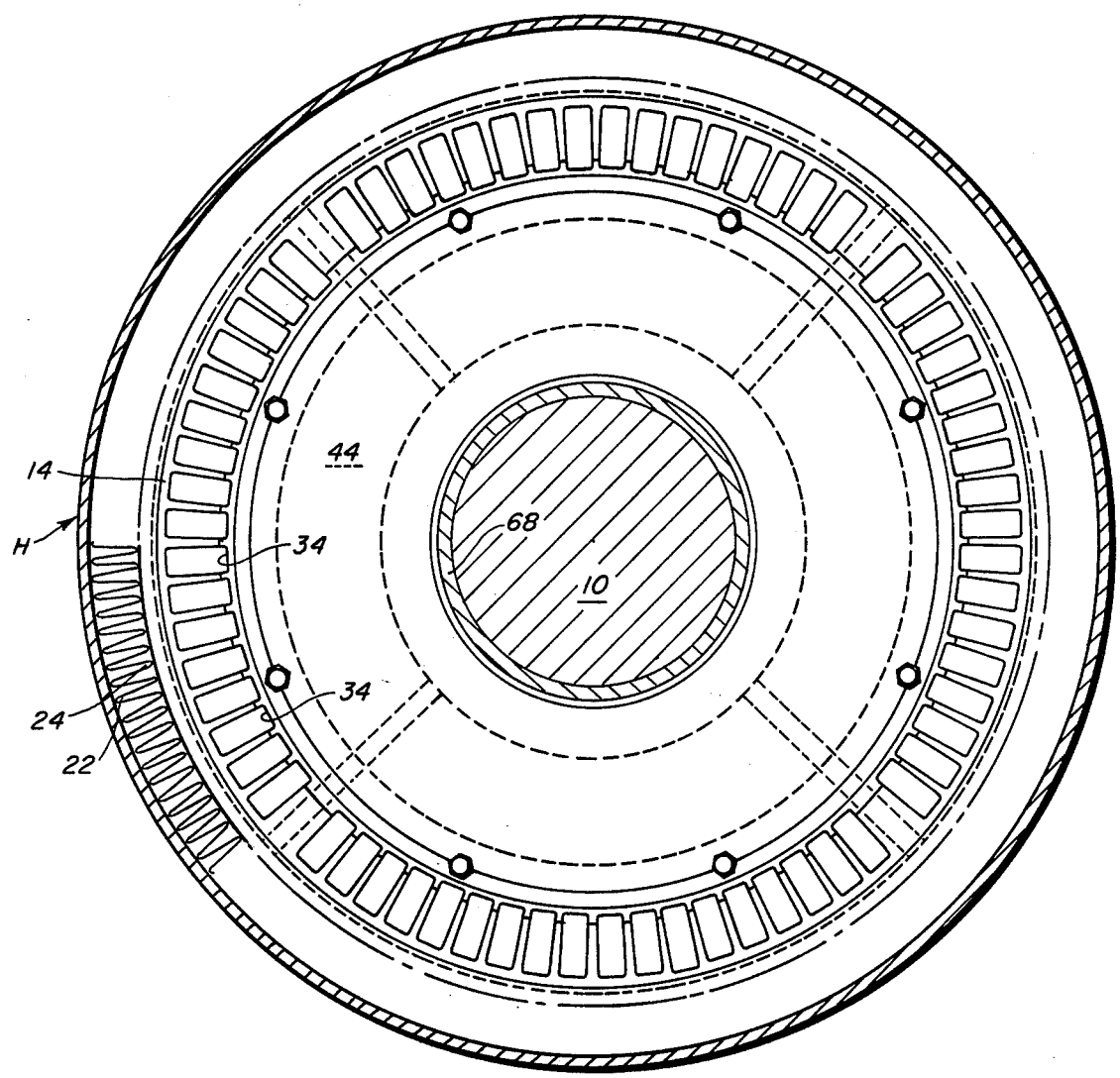

HEAT EXCHANGER FOR SHAFT SEAL CARTRIDGE

BACKGROUND OF THE INVENTION

The provision of a mechanical seal assembly for preventing leakage along a rotary shaft extending into or through a housing, such as a pump housing, has involved the utilization of double and tandem seals, each including a pair of complemental relatively rotatable seal rings respectively carried by the housing and the shaft through suitable mounting means. Where high temperature fluids are encountered, the seal assembly, and more particularly the seal rings may be cooled by a coolant fluid circulated through the seal chamber and through a surrounding heat exchanger. To assist in cooling, the heat exchanger may be exposed externally of the housing or may be subjected to air flow induced by a fan rotatable with the shaft.

One form of heat exchanger is shown and described in U.S. Pat. No. 3,884,482, granted May 20, 1975 and a division thereof U.S. Pat. No. 3,941,395, granted Mar. 2, 1976.

In the heat exchanger shown and described in the aforesaid patents, coolant fluid is circulated by an axial flow impeller associated with the shaft and a housing and a flow path for the coolant fluid is provided in between the housing and a jacket having cooling fins. Cooling air is impelled along the fins by an air pump associated with the shaft.

THE INVENTION

The invention herein described is an improvement over the heat exchanger shown and described in the aforesaid U.S. Letters Patents. The improved heat exchanger of this invention comprises an axial flow pump for circulating cooling fluid which pump is associated with the shaft and a housing. The axial flow pump is constructed with a generally centrally located inlet radially directed and discharges the coolant axially outwardly from the inlet. Thus the pump has two outlets. The coolant path is established between the housing and a jacket with fins thereon. The fins are shrouded to restrict cooling air flow therealong from an air pump. In addition the housing is provided with axial open ended passages generally parallel to the fins through which cooling air from the air pump flows. The net result from the improved coolant flow pattern and the improved heat exchanger structure is improved cooling and long life to the seals thus reducing down time for replacement and repairs.

THE DRAWINGS

FIG. 1 is a view partly in longitudinal section and partly in elevation, illustrating a cooled mechanical seal arrangement with a heat exchanger and coolant pump according to this invention; and FIG. 2 is a sectional view taken on line 2—2 of FIG. 1.

DETAILED DESCRIPTION

Referring now to the drawings, the seal cartridge, generally identified as S is interposed between a motor housing schematically shown and identified as M and a pump housing also schematically shown and identified as P in an elongated intermediate housing H located between the motor housing M and the pump housing P. The housing H connects the housing M and P in spaced relation to one another. Rotary shaft means 10 connects the motor (not shown) and the pump (not shown), and is constructed of multiple parts, one part 12 of which is operatively associated with the seal cartridge and is located in the housing H. The motor is adapted to drive the rotary shaft means 10 and the pump. This general arrangement is substantially the same as that shown and described in the aforesaid patents.

The seal cartridge S comprises a cylindrical body 14 adapted to contain the mechanical seal means hereinafter to be described, and about which is disposed a tubular jacket 16 defining with the body 14 helical flow passages 18 and 20 for cooling fluid which is circulated through the seal assembly, as will be described. To assist in cooling the jacket 16, it is provided with radiating ribs 22 and longitudinally extending grooves 24 through which air is forced by a fan 26. The fan 26 has blades 28 carried by a supporting ring 30 connected to the shaft means 10. A cylindrical shroud 32 shrouds the fan 26 and also surrounds the jacket 16 to confine the air to the grooves 24 and thus enhance the cooling of the ribs 22.

To further enhance the cooling fluid which flows through the passages 18 and 20, the body 14 is provided with a multiplicity of open-ended axial passageways 34 radially inwardly of the passages 16 and 18 and generally parallel with the ribs 22. These passageways 34 are so located to receive air from the fan 26.

The cooling fluid is circulated by means of a dual action axial flow pump, generally identified as 36. The pump 36 comprises a rotor 38 and a stator 40, the rotor 38 being connected to the shaft means 10 while the stator 40 is connected as by one or more machine bolts 42 to the body 14. The stator 40 defines with the body 14 a pair of cooling fluid chambers 44, 46 each communicating with one of the mechanical seal means to be described. The pump 36 has a central inlet 48 communicating with an inlet passage 50 in the body 14 which intersects the helical passages 18 and 20 adjacent one of their ends. The opposite ends of the passages 18 and 20 intersect discharge passages 52 and 54 formed in the body 14 from the chambers 44, 46, respectively. One of the discharge passages is connected via suitable passages to a filter 56, so as to filter the cooling fluid and remove foreign material therefrom. The rotor 38 and the stator 40 of the pump 36 are so constructed with right and left hand vanes so that cooling fluid flows from a central inlet 48 to discharge outlets 58, 60, and into the chamber 44, 46, respectively.

The mechanical seal means comprise one seal, generally identified as 62 positioned to be cooled by the cooling fluid in the chamber 44 and another seal, generally identified as 64, positioned to be cooled by the cooling fluid in the chamber 46.

The mechanical seal 62 comprises a rotating seal ring 66 surrounding an axial sleeve 68 integrally formed with the rotor 38 of the pump 36 and connected for rotation to the shaft 12. The ring 66 is connected to the rotor 38 by means of a drive pin 70 having one end received in a suitable opening 72 in the ring 66 and the other end, an enlarged cap, received in a slot 74 in the rotor 38. Thus the ring 66 rotates with the rotor 38 and the shaft 12. The ring 66 has a radially disposed seal face 76 and may be constructed of carbon or other suitable, conventional material.

The mechanical seal 62 also comprises a stationary seal ring 78 having a seal face 80 which engages the seal face 76 of the seal ring 66. The ring 78 is constructed of conventional materials. The stationary seal ring is connected to a flange 81 by a retainer 82, the flange 81 further defining the cooling fluid chamber 44. The flange 81 is connected to the body 14 by machine bolts 84. The seal ring 78 is resiliently urged toward the seal ring 66 by a plurality of coil springs 86 each received in a pocket 88 in the flange 81. Between the springs 86 and the ring 78 is a U-cup follower 90 which abuts an elastomer U-cup 92 received in a groove 94 in the ring 78. As shown in the drawings, the seal rings 66 and 78 are exposed to the cooling fluid in the chamber 44. Suitable O-rings are provided as required.

The other seal 64 comprises a rotating seal ring 96 similar in construction to the seal ring 66; the ring 96 having a seal face 98 and being connected to the rotor 38 by means of a resilient elastomeric ring 100. The seal 64 comprises a stationary seal ring 102 having a seal face 104 engaging the seal face 98. The ring 102 is connected to a lower body flange 106 through a retainer 108 and a drive pin 110, the drive pin 110 having its shank received in an opening 112 in the retainer 108 and an enlarged cap end 114 in a slot 116 in the ring 102. A U-cup follower 118 and a U-cup received in a groove 120 in the ring 102 complete the seal which, as shown, fits on a cylindrical flange 122 of the lower body flange 106. The rings 96 and 102 are exposed to the cooling fluid in the chamber 46.

As indicated by the various arrows on the drawing, the flow of cooling fluid, as for example, seal lube oil, is from the axial flow pump 36 to the cooling fluid chambers 44, 46 through the passages 52, 54 and 18 and 20 to the pump inlet 50. At least a portion of the fluid is filtered by te filter 56. Cooling air is impelled by the pump 26 and through the passages 34 and through the grooves 24 and by the fins 22.

I claim:

1. A seal assembly for use with a rotary shaft and a case comprising:
    a housing connected to said case;
    a seal chamber defined by said housing and said shaft;
    mechanical seal means in said seal chamber for preventing leakage between said shaft and said case;
    cooling fluid chambers defined by said seal means and said housing;
    cooling fluid impelling means between said cooling fluid chambers and further defining said chambers for causing cooling fluid to flow from said impelling means to each of said chambers;
    said impelling means comprising rotor and stator means;
    inlet means to said impeller means for the flow of cooling fluid thereto;
    an outlet from each chamber for the flow of cooling fluid therefrom; and
    heat exchanger means connected to said outlets and to said inlet means for cooling said cooling fluid which flows from said outlets to said inlet means.

2. A seal assembly as recited in claim 1 in which said impelling means is an axial flow impeller and its rotor is connected to said shaft and its stator is connected to said housing.

3. A seal assembly as recited in claim 2 in which said inlet means is provided centrally in said axial flow impeller to impel cooling fluid outwardly from said central inlet means.

4. A seal assembly as recited in claim 1 in which said heat exchanger means comprises jacket means with means defining grooves therein, said jacket means surrounding said housing and said grooves defining with said housing paths for said cooling fluid and being connected to said outlets and said inlet means.

5. A seal assembly as recited in claim 4 further comprising longitudinal passageways through said housing radially inwardly of said jacket means and means to supply cooling air to and through said passageways.

6. A seal assembly as recited in claim 4 further comprising cooling ribs on the outer periphery of said jacket and means to supply cooling air to said ribs.

7. A seal assembly as recited in claim 6 further comprising a shroud circumferentially around said ribs to confine the cooling air therealong.

* * * * *